US012021203B2

(12) United States Patent
Rodenburg et al.

(10) Patent No.: US 12,021,203 B2
(45) Date of Patent: Jun. 25, 2024

(54) BATTERY MODULE MONITORING BOARD EMI REDUCTION

(71) Applicant: Rivian IP Holdings, LLC, Plymouth, MI (US)

(72) Inventors: Justin Rodenburg, Laguna Beach, CA (US); Jorge Rodriguez, Ladera Ranch, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 350 days.

(21) Appl. No.: 16/681,668

(22) Filed: Nov. 12, 2019

(65) Prior Publication Data

US 2020/0152949 A1    May 14, 2020

Related U.S. Application Data

(60) Provisional application No. 62/760,825, filed on Nov. 13, 2018.

(51) Int. Cl.
*H01M 10/42*    (2006.01)
*H01M 10/48*    (2006.01)
(Continued)

(52) U.S. Cl.
CPC ....... *H01M 10/425* (2013.01); *H01M 10/482* (2013.01); *H01M 50/204* (2021.01);
(Continued)

(58) Field of Classification Search
CPC .......................... H01M 50/298; H01M 50/569
See application file for complete search history.

(56) References Cited

U.S. PATENT DOCUMENTS

2012/0212232 A1*  8/2012  Ikeda ................. H01M 10/482
                                                      324/426
2015/0285839 A1* 10/2015  Merriman ........... H01M 10/482
                                                       429/90
(Continued)

FOREIGN PATENT DOCUMENTS

EP           3 109 922       12/2016
WO       WO 2017181282      10/2017

OTHER PUBLICATIONS

PCT International Search Report and Written Opinion for International Application No. PCT/US2019/061014, dated Feb. 27, 2020.

*Primary Examiner* — Stephan J Essex
(74) *Attorney, Agent, or Firm* — Haley Guiliano LLP (57) ABSTRACT

Systems and methods are described herein for reducing electromagnetic interference (EMI) affecting measurements of a battery module monitoring board. A battery module system includes battery cells on a top side and a bottom side of the battery module. Each battery cell is electrically coupled between an adjacent pair of busbars. Each busbar is coupled to at least one sensor wire. One busbar, which spans the top and bottom sides of the battery module, is coupled to two sensor wires such that EMI interference affecting measurement signals (e.g., noise signals accompanying voltage readings) associated with the top side of the battery module are in-phase with one another and the measurement signals associated with the bottom side of the battery module are in-phase with one another, such that the EMI interference generally cancels in measurement calculations.

18 Claims, 5 Drawing Sheets

(51) Int. Cl.
*H01M 50/204* (2021.01)
*H01M 50/298* (2021.01)
*H01M 50/505* (2021.01)
*H01M 50/569* (2021.01)

(52) U.S. Cl.
CPC ....... *H01M 50/298* (2021.01); *H01M 50/505* (2021.01); *H01M 50/569* (2021.01); *H01M 2010/4271* (2013.01); *H01M 2010/4278* (2013.01); *Y02E 60/10* (2013.01)

(56) References Cited

U.S. PATENT DOCUMENTS

| | | |
|---|---|---|
| 2018/0069223 A1 | 3/2018 | Schmidt |
| 2019/0285699 A1* | 9/2019 | Weidner ............. G01R 31/3648 |

* cited by examiner

502
Measure, using a first sensor wire coupled to a first busbar, a voltage reading of the first busbar

504
Measure, using a second sensor wire coupled to a second busbar proximate to where one of an at least one first battery cell is coupled to the second busbar, a first voltage reading of the second busbar

506
Measure, using a third sensor wire coupled to the second busbar proximate to where one of an at least one second battery cell is coupled to the second busbar, a second voltage of the second busbar

508
Measure, using a fourth sensor wire coupled to a third busbar, a voltage reading of the third busbar

510
Determine a voltage difference between the first busbar and the second busbar using the measured voltage of the first busbar and the measured first voltage of the second busbar

512
Determine a voltage difference between the second busbar and the third busbar using the measured second voltage of the second busbar and the measured voltage of the third busbar

FIG. 5

BATTERY MODULE MONITORING BOARD EMI REDUCTION

CROSS REFERENCE TO RELATED APPLICATION

This application claims the benefit of U.S. Provisional Patent Application No. 62/760,825 filed Nov. 13, 2018, the disclosure of which is hereby incorporated by reference herein in its entirety.

The present disclosure is directed towards a battery module, and more particularly towards the measurement battery parameters within the battery module.

INTRODUCTION

Battery module monitoring boards provide voltage and temperature measurements of battery cells within a battery module. However, these measurements may be distorted by EMI generated by the currents traveling through busbars that are coupled to the battery cells. Reducing the EMI in the battery module monitoring boards signals to allow accurate voltage and temperature measurements is critical to the safe operation of the battery module. Battery module monitoring board EMI reduction in a double-stacked battery module may be achieved by routing the wiring that connects the battery module monitoring board to the busbars such that the measurement signals have interference that is in-phase and the calculated voltage result is accurate.

SUMMARY

One aspect of the present disclosure is directed to a battery module system. The battery module includes a top side, a bottom side, a first side wall connecting the top side and the bottom side at one end, and an opposing side wall connecting the top side and the bottom side at an opposing end. The battery module includes a first plurality of busbars spaced along the top side from the first side wall to the opposing side wall. At least one first battery cell is electrically coupled between each adjacent pair of the first plurality of busbars. The battery module includes a second plurality of busbars spaced along the bottom side from the first side wall to the opposing side wall. At least one second battery cell is electrically coupled between each adjacent pair of the second plurality of busbars. One busbar of the first and second pluralities of busbars is proximate to the opposing end, spans the top and bottom sides of the battery module, and is electrically coupled to at least one battery cell located on the top side and at least one battery cell located on the bottom side of the battery module. The battery module includes a first group of sensor wires extending along the top side. Each one of the first plurality of busbars is coupled to a respective sensor wire of the first group of sensor wires. The battery module includes a second group of sensor wires extending along the bottom side. Each one of the second plurality of busbars is coupled to a respective sensor wire of the second group of sensor wires. The one busbar that spans the top and bottom sides of the battery module is coupled to one sensor wire of the first group on the top side and one sensor wire of the second group on the bottom side of the battery module.

The battery module system includes, in some embodiments, a first wiring harness bundling the first group of sensor wires and a second wiring harness bundling the second group of sensor wires. The battery module system, in some embodiments, includes a first processing circuitry coupled to the first group of sensor wires. The first processing circuitry may be configured to receive respective voltage signals from the first group of sensor wires.

The battery module system, in some embodiments, includes a second processing circuitry coupled to the second group of sensor wires. The second processing circuitry may be configured to receive respective voltage signals from the second group of sensor wires. The first processing circuitry is, in some embodiments, configured to receive a first voltage reading from a first busbar associated with the top side of the battery module, receive a second voltage reading from a second busbar associated with the top side of the battery module and is adjacent to the first busbar, and compute a first voltage difference between the first voltage reading and the second voltage reading. The first voltage difference and the second voltage difference may be provided to a battery management system. The second processing circuitry is, in some embodiments, configured to receive a third voltage reading from a third busbar associated with the bottom side of the battery module, receive a fourth voltage reading from a fourth busbar associated with the bottom side of the battery module and is adjacent to the third busbar, and compute a second voltage difference between the third voltage reading and the fourth voltage reading. In some embodiments, the second busbar and the fourth busbar together comprise the one busbar that spans the top and bottom sides of the battery module.

In some embodiments, the first voltage difference comprises a difference between a first noise signal comprising a first phase and a second noise signal comprising a second phase. The first phase may be substantially in-phase with the second phase. In some embodiments, the first processing circuitry is powered by the top side of the battery module and the second processing circuitry is powered by the bottom side of the battery module. The first processing circuitry is, in some embodiments, configured to determine the voltage across each adjacent pair of busbars on the top side of the module. The second processing circuitry is, in some embodiments, configured to determine the voltage across each adjacent pair of busbars on the bottom side of the battery module.

The first plurality of busbars may include at least five busbars and the second plurality of busbars may include at least five busbars. In some embodiments, the battery module is electrically coupled to a load. A current flows, in some embodiments, through the first plurality of busbars in a first spatial direction away from the first side wall and through the second plurality of busbars in a second spatial direction towards the first side wall. The first group of sensor wires extends, in some embodiments, along the top side from the first side wall toward the opposing side wall. The second group of sensor wires extends, in some embodiments, along the bottom side from the first side wall toward the opposing side wall. A first electromagnetic field may be induced by the current flowing through the first plurality of busbars in the first spatial direction. A second electromagnetic field may be induced by the current flowing through the second plurality of busbars in the second spatial direction.

Another aspect of the present disclosure is directed to a method of operating a battery module including a first busbar, a second busbar, a third busbar, at least one first battery cell electrically coupled between the first and second busbars, and at least one second battery cell electrically coupled between the second and third busbars. A voltage reading of the first busbar is measured using a first sensor wire coupled to the first busbar. A first voltage reading of the second busbar is measured using a second sensor wire coupled to the second busbar proximate to where one of the at least one first battery cell is coupled to the second busbar. A second voltage of the second busbar is measured using a third sensor wire coupled to the second busbar proximate to where one of the at least one second battery cell is coupled to the second busbar. A voltage reading of the third busbar is measured using a fourth sensor wire coupled to the third busbar. A voltage difference between the first busbar and the second busbar using the measured voltage of the first busbar and the measured first voltage of the second busbar is determined. A voltage difference between the second busbar and the third busbar using the measured second voltage of the second busbar and the measured voltage of the third busbar is determined.

It should be noted that the systems, methods, apparatuses, and/or aspects described above may be applied to, or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts through and in which.

DESCRIPTION

The present disclosure is directed to a double-stacked battery module having a top side, a bottom side, a first side wall connecting the top side and the bottom side at one end, and an opposing side wall connecting the top side and the bottom side at an opposing end. Electrical busbars are connected together to extend the path of current across the top side of the module, from the top to the bottom side of the module, and back across the bottom side of the module. The busbars may be spaced along the top side of the module from one side wall to an opposing side wall and along the bottom side such that they are located underneath top busbars. Busbars are made of electrically conducting material such as, for example, copper, aluminum, any other suitable metal, alloy, or material that has a desired electrical conductivity, or any combination thereof.

Sensor wires (also referred to herein as "signal wires") are used to obtain voltage measurements for each of the battery cells within the module. Sensor wires secured by wiring harnesses are run from a processing circuit to respective measurement locations in the battery module. The processing circuit is configured to receive the sensor wire signals (also referred to herein as "measurement signals") and determine measurements (e.g., voltage measurements) for each of the battery cells. A voltage measurement for a battery cell may be obtained by taking the difference between the voltage measurements of an adjacent pair of busbars, wherein at least one battery cell is electrically coupled between that pair of busbars.

In some embodiments, the battery module exhibits behavior similar to an inductive coil whereby, when current flows through it, electromagnetic fields (EMF) are generated. The electromagnetic fields may couple with sensor wires, introducing noise into them. In this example, the EMF can distort the measurements of the battery module that are safety-critical measurements.

With a double-stacked battery module, the electromagnetic interference (EMI) can be the result of electromagnetic fields that are out-of-phase with one another. In such a module, the current may flow through busbars in one direction on the top side of the battery module and the opposite direction on the bottom side of the module. One busbar may span the top and bottom sides of the battery module to collect the current at the end of the top side of the module and provide the current to the bottom side of the battery module. Sensor wires extend from one side of battery module across the top and bottom sides of the battery module to respective measurement locations on the top and bottom sides. The measurement locations are typically located on the busbars. Because current flows in opposite directions on the top and bottom sides of the battery module, the electromagnetic interference on the top and bottom sides are out-of-phase with one another.

Voltage measurements may be distorted when a difference is taken between signals from opposing sides of the battery module (e.g., measuring the voltage of the busbar that spans the top and bottom sides on one side and using this signal to obtain the voltage measurement across a battery cell on the opposite side from which the measurement is taken). The EMF generated by current flow through the busbars creates EMI that affects the sensor wires coupled with the top side of the battery module such that the measurement signals carried by the top sensor wires have noise that is in-phase with one another. Likewise, the measurement signals carried by the bottom sensor wires have noise that is in-phase with one another. However, a phase difference in the noise between the measurement signals carried by the top sensor wires and the bottom sensor wires is non-zero (e.g., the noise affecting the sensor wires on the top is out-of-phase with the noise affecting the sensor wires on the bottom). In some embodiments, the EMF on the top side may have a phase that is 180 degrees out-of-phase from the EMF on the bottom side. When taking a voltage difference measurement with the EMF-induced noise signals that are 180 degrees out of phase, the magnitude of the interference caused by the EMF may double.

To reduce the interference caused by the induced EMF, the sensor wires can be arranged such that voltage measurements are not taken as the difference between the signals carried by sensor wires that are on opposite sides of the battery module. Voltage measurement may be taken such that the processing circuitry subtracts the in-phase noise signals from the same side of the battery module, calculating an accurate voltage measurement with the effects of EMI reduced. The reduction or cancellation of EMI by subtracting out similar noise signals (e.g., in-phase noise signals) can be achieved with the proper sensor wire arrangement.

One such arrangement is to include an additional sensor wire such that the voltage of the busbar that spans the top and bottom sides of the battery module is measured twice—once from the top side and once from the bottom side. For example, a sensor wire coupled to the top half of a busbar spanning the top and bottom may carry a noise signal that is in-phase with the other noise signals of the top sensor wires, and an additional sensor wire coupled to the bottom half of the busbar may carry a noise signal that is in-phase with the other noise signals of the bottom sensor wires. Further in this example, the noise signals impacting the sensor wires on the top side of the battery module may be very similar. As a result, the voltage measurements taken across battery cells located on the top side of the module will comprise very little noise signal because a difference is being taken between two signals that have very similar in-phase noise signals, which will cause the noise signals to mostly cancel. The same result occurs for the voltage measurements on the bottom side of the battery module.

Figure 1:
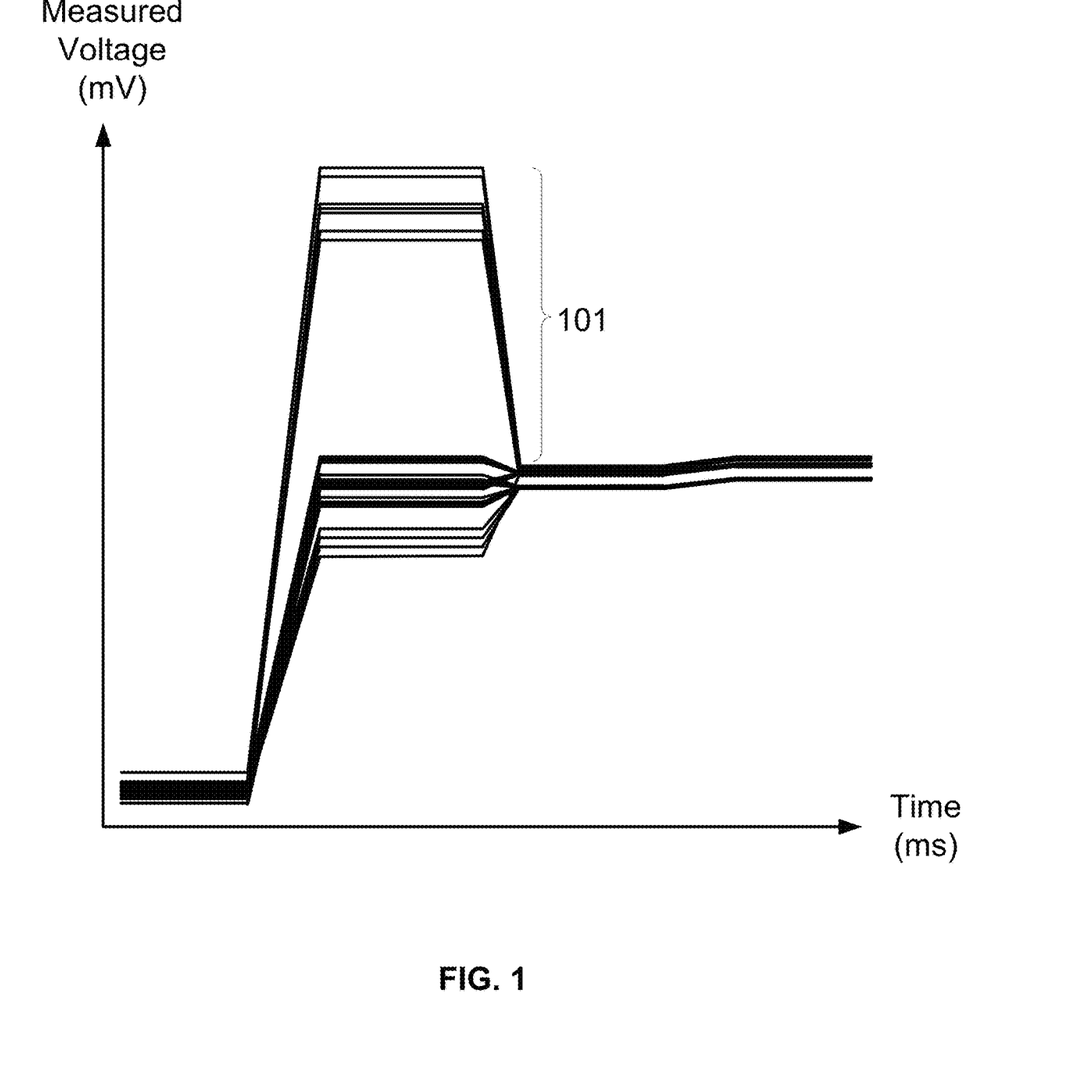
FIG. 1 shows a graph of voltage across a battery cell over time, in accordance with at least some embodiments of the disclosure.

FIG. 1 shows a voltage overshoot problem that arises during voltage measurements of a double-stacked battery module. A double-stacked module may have 12 battery cells in total, where six are arranged in series on the top side of the module and the other six are similarly arranged on the bottom side of the module. The battery cells in this double-stacked module are connected by busbars that allow for a path of current to flow from the first cell on the top half of the battery module through the second cell, third cell, and onwards towards the twelfth cell on the bottom side of the module. Specifically, the current from the load associated with the battery module will make first contact with a busbar that is associated with the first battery cell, enter the first battery cell through its negative terminal, exit the first battery cell through its positive terminal, and the current will then contact the busbar that is between the first battery cell and the second battery cell. This process may repeat for all the battery cells and associated busbars until the current flows back to the load. In the path that the current travels, there may a busbar that spans both the top and bottom sides of the module that is associated with the positive terminal of the sixth battery cell and the negative terminal of the seventh battery cell.

FIG. 1 shows a graph of voltage across a battery cell over time, in accordance with at least some embodiments of the disclosure. During a thermal performance test of the double-stacked battery module with the aforementioned structure, a Battery Management System may report a relatively high increase in voltage across the seventh battery cell during a transition between a discharging state and a charging state. Table 1 shows an increase in voltage of 720 mV reported across the seventh cell, whereas the increase in voltage during a discharge-to-charge transition for other cells is reported to be within 102 mV. This increase in voltage is depicted in FIG. 1 as voltage overshoot 101. Voltage overshoot is defined as the difference between the steady state voltage and the peak measured voltage across a battery cell. In the same example, the processing circuitry may report a −700 mV overshoot during a charge-to-discharge transition associated with the seventh cell, where this overshoot is much greater than that of other cells.

TABLE 1

Overshoot voltage measurement across battery cells

| Cell | Overshoot voltage measured at voltage tap wire end (millivolts) |
|---|---|
| #1 | 0 |
| #2 | 12 |
| #3 | 18 |

TABLE 1-continued

Overshoot voltage measurement across battery cells

| Cell | Overshoot voltage measured at voltage tap wire end (millivolts) |
|---|---|
| #4 | 30 |
| #5 | 60 |
| #6 | 102 |
| #7 | 720 |
| #8 | 0 |
| #9 | 0 |
| #10 | 10 |
| #11 | 18 |
| #12 | 42 |

Figure 2:
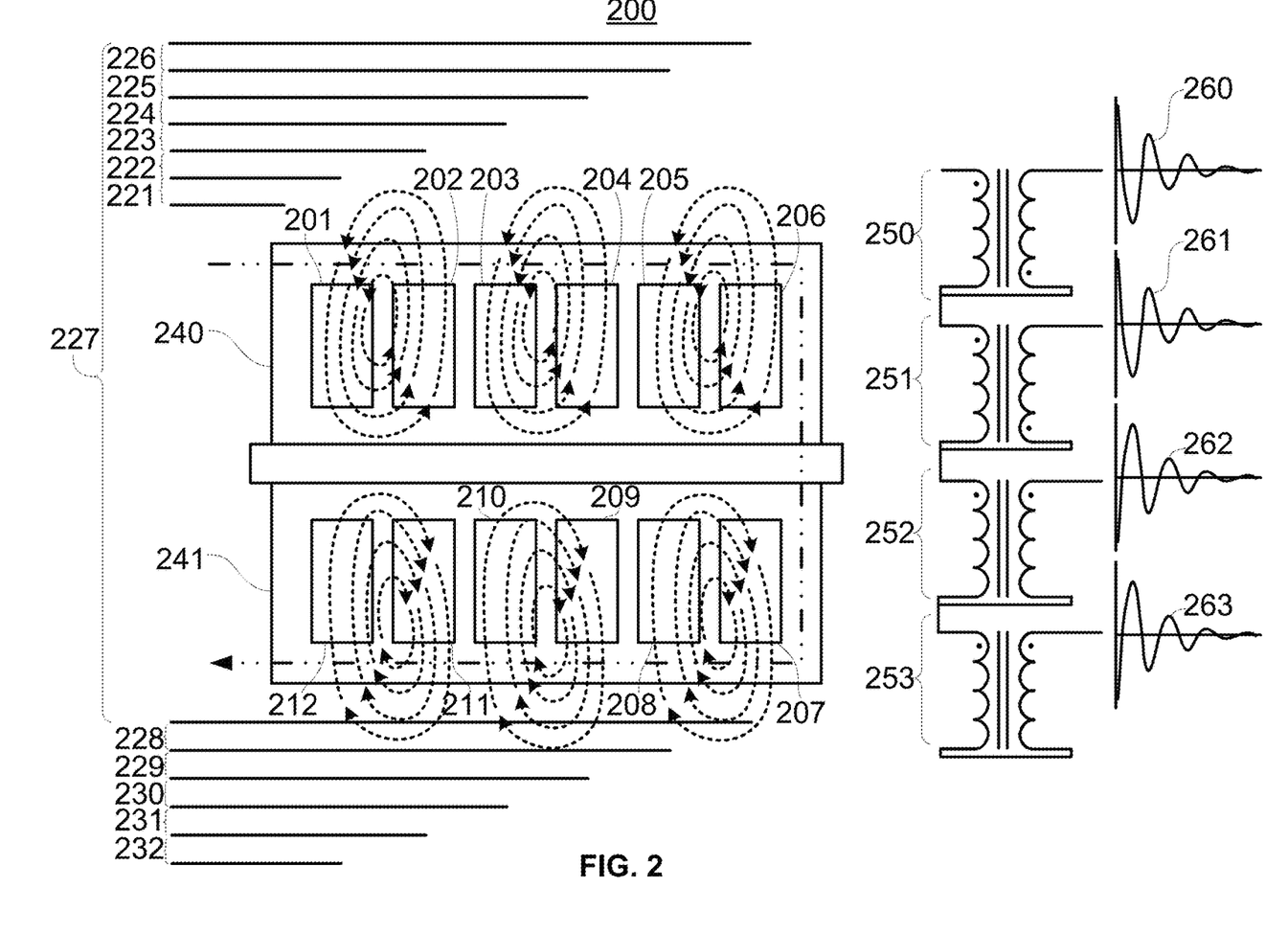
FIG. 2 shows an illustrative battery module and noise signals carried by sensor wires on adjacent busbars that span battery cells in the battery module, in accordance with at least some embodiments of the disclosure.

For most sensor wire placements, the routing distance from the processing circuitry to the busbar can cause interference to the measurement signal carried through the wire. However, when the noise is in-phase with the noise signals carried by sensor wires to adjacent busbars, the interference will be eliminated or reduced when calculating the voltage across the battery cell. FIG. 2 shows noise signals 260-263 carried by sensor wires on adjacent busbars that span battery cell 205 through battery cell 208 in battery module 200. The sensor wires may be referred to as "cell taps." For example, cell tap 250 is associated with the sensor wire that is in contact with the busbar that connects the positive terminal of battery cell 208 and the negative terminal of battery cell 209, cell tap 251 is associated with the sensor wire that is in contact with the busbar that connects the positive terminal of battery cell 207 and the negative terminal of battery cell 208, cell tap 252 is associated with the sensor wire that is in contact with the busbar that connects the positive terminal of battery cell 206 and the negative terminal of battery cell 207, and cell tap 253 is associated with the sensor wire that is in contact with the busbar that connects the positive terminal of battery cell 205 and the negative terminal of battery cell 206. In some embodiments, voltage measurements 221-232 across battery cells 201-212, respectively, are determined by subtracting voltage readings across cell taps. The horizontal lines depicted in FIG. 2 above and below the battery module represent the sensor wires that extend across the battery module to the various cell taps or bus bars. For example, to obtain voltage measurement 226 of battery cell 206, the signal on cell tap 253 would be subtracted from the signal on cell tap 252. Noise signals 260-263 affect the voltage measurement signals taken from cell taps 250-253, respectively. During this subtraction, the noise signals 260 and 261 carried on cell tap 250 and cell tap 251, respectively, may be eliminated or mostly eliminated because the noise signals are in-phase. However, measuring the voltage on battery cell 207 (i.e., voltage measurement 227) using the signals on cell tap 252 (measured on top side 240 of the battery module) and cell tap 251 (measured on bottom side 241 of the battery module) may result in double the noise interference because the noise signals 262 and 261 are out-of-phase.

Figure 3:
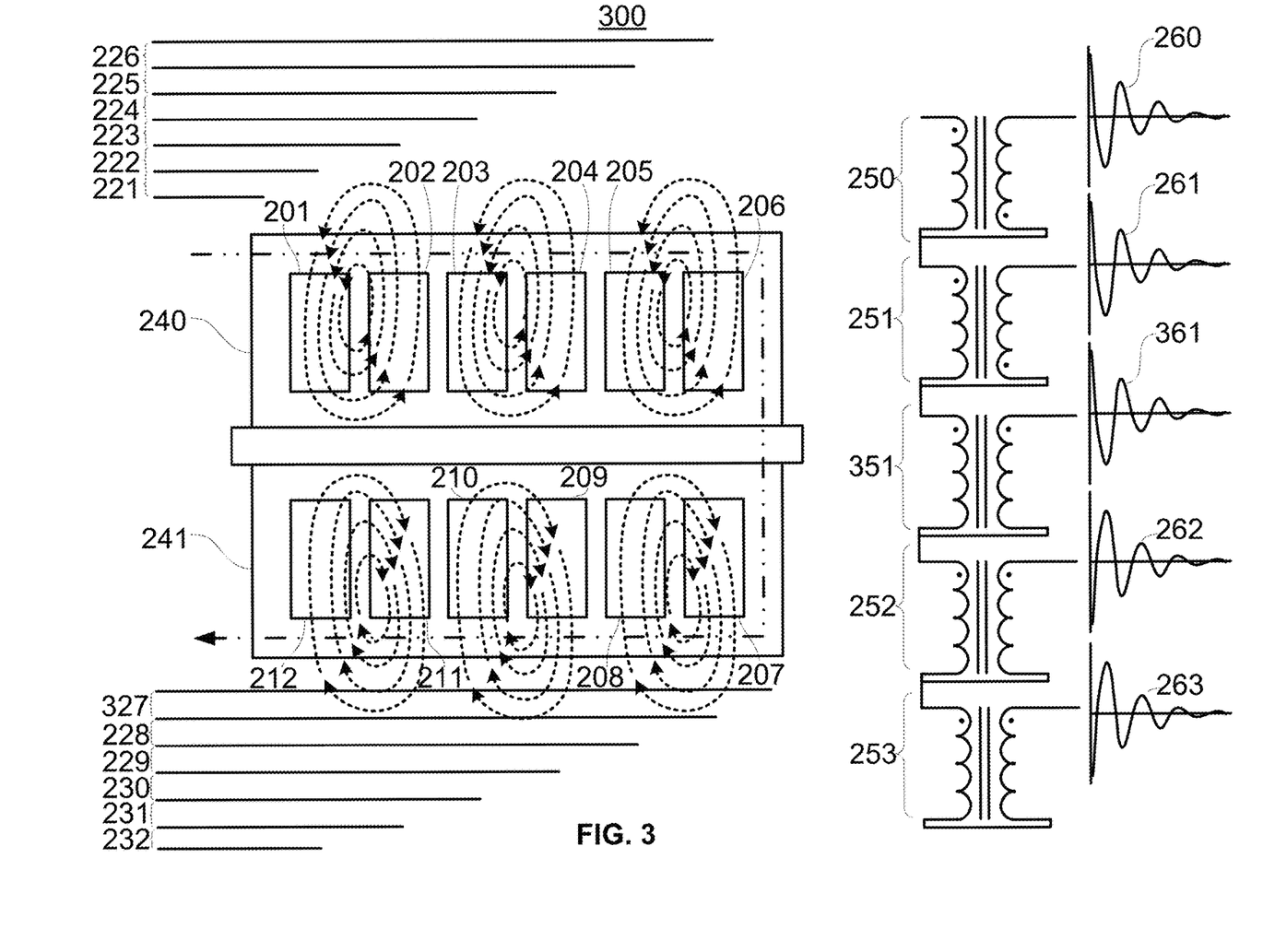
FIG. 3 shows the illustrative battery module of FIG. 2 having an additional sensor wire, in accordance with at least some embodiments of the disclosure.

One approach to maintaining in-phase noise signals carried by adjacent busbars of the top and bottom sides, respectively, is to separate voltage readings between the top and bottom sides of the double-stacked battery module. Separate voltage readings can be obtained by the addition of a second sensor wire that will be associated with the busbar that spans the top and bottom sides. This additional sensor wire will be on the opposite side of the sensor wire that is associated with the busbar that spans both the top and bottom sides of the battery module. FIG. 3 shows the additional sensor wire cell tap 351 added to the arrangement of FIG. 2. Voltage measurement 327 is taken from an additional sensor wire electrically coupled to the bus bar that spanning battery cells 206 and 207. Cell tap 351 is associated with the bottom side of the busbar that spans top side 240 and bottom side 241 of battery module 300 and cell tap 252 is associated with the top side of the busbar that spans top side 240 and bottom side 241 of battery module 300. With the additional sensor wire, voltage measurement 327 across battery cell 207 using the signals on cell tap 351 and cell tap 251 may be unaffected by out-of-phase EMI that was incurred by comparing signals on opposite sides of battery module 300.

An additional source of EMI may be from the crosstalk interference of wires bundled in a harness. Harnesses are used to organize the wire routing within the compact space of the battery module. Bringing these sensor wires together to be processed with a single processing circuitry unit will cause the noise signals of the top sensor wires and the bottom sensors wires to bleed or leak between each other, thereby causing noise that will not cancel. Accordingly, noise is reduced further by processing the top and bottom sensor wires separately.

Figure 4:
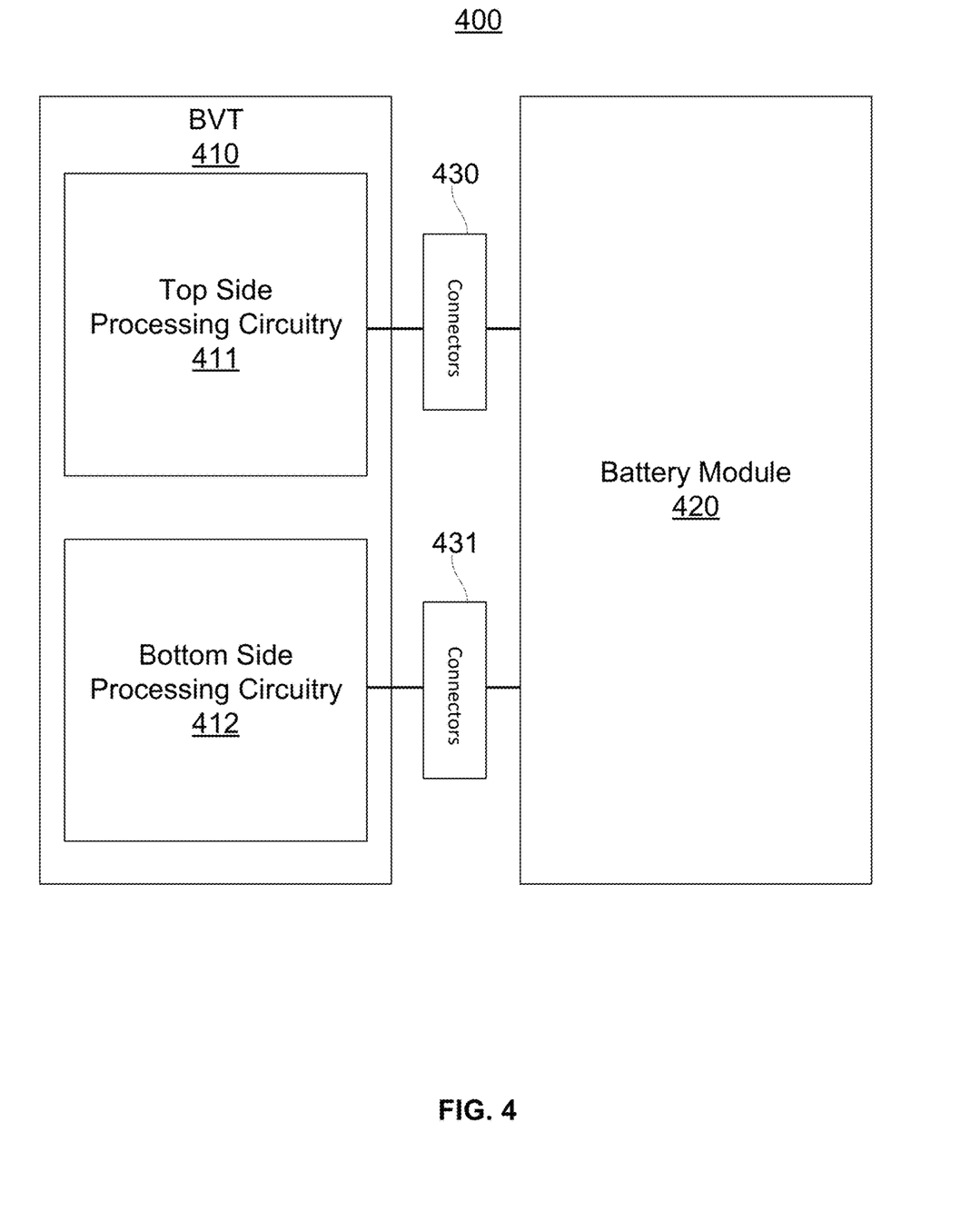
FIG. 4 shows an illustrative arrangement of a battery module monitoring board electrically coupled to a battery module, in accordance with at least some embodiments of the disclosure.

FIG. 4 shows an illustrative arrangement 400 of a battery module monitoring board electrically coupled to battery module 420. Arrangement 400 shows an example of separated processing circuitries 411 and 412 within battery module monitoring board 410 to further reduce noise. Because the sensor wires of the top side are not bundled together with the sensor wires of the bottom side when traveling to one processing unit in the battery module monitoring board, the effects of crosstalk EMI between the top and bottom signals is reduced. In some embodiments, sensor wires associated with processing circuitry 411 are electrically coupled through connectors 430 and sensor wires associated with processing circuitry 412 are electrically coupled through connectors 431. The sensor wires associated with the top side of battery module 420 interface with processing circuitry 411 dedicated to the top side of battery module 420. The processing circuitry 411 is configured to receive voltage readings from an adjacent pair of busbars on the top side of battery module 420 and compute the voltage difference to determine the voltage measurement of the battery cell associated with the adjacent pair of busbars. Similarly, the processing circuitry 412 is configured to receive voltage readings from an adjacent pair of busbars on the bottom side of battery module 420 and compute the voltage difference to determine the voltage measurement of the battery cell on the bottom of battery module 420 associated with the adjacent pair of busbars.

The sensor signals received by processing circuitry 411 may have noise that is substantially in-phase with the noise associated with other sensor wires bundled in a harness from the top side. Processing circuitry 412, likewise, may have noise that is substantially in-phase with the noise associated with other wires in the wiring harness from the bottom side of the battery module. Because of the separate processing circuitries, the wiring harness for the top side of the battery module and the wiring harness for the bottom side of the battery module may not meet or be close to each other, achieving the benefit of less crosstalk interference than in an instance where both sides of wires are bundled in a single harness to a single processing circuitry in the battery module monitoring board. The voltage differences calculated by the processing circuitry may be provided to a battery management system.

A battery stack monitoring application specific integrated circuit (ASIC) may monitor up to 6 battery cells. In some embodiments, a battery stack monitoring ASIC receives the sensor wire signals associated with the top side of a double-stacked module with up to six battery cells, and another battery stack monitoring ASIC can be used to receive the signals associated with the bottom side. As used herein, wires include individual standalone wires and/or separate traces on a circuit board. As used herein, a harness includes a bundle of wires and/or multiple traces on a circuit such as a flexible printed circuit board or "Flex PCB."

Figure 5:
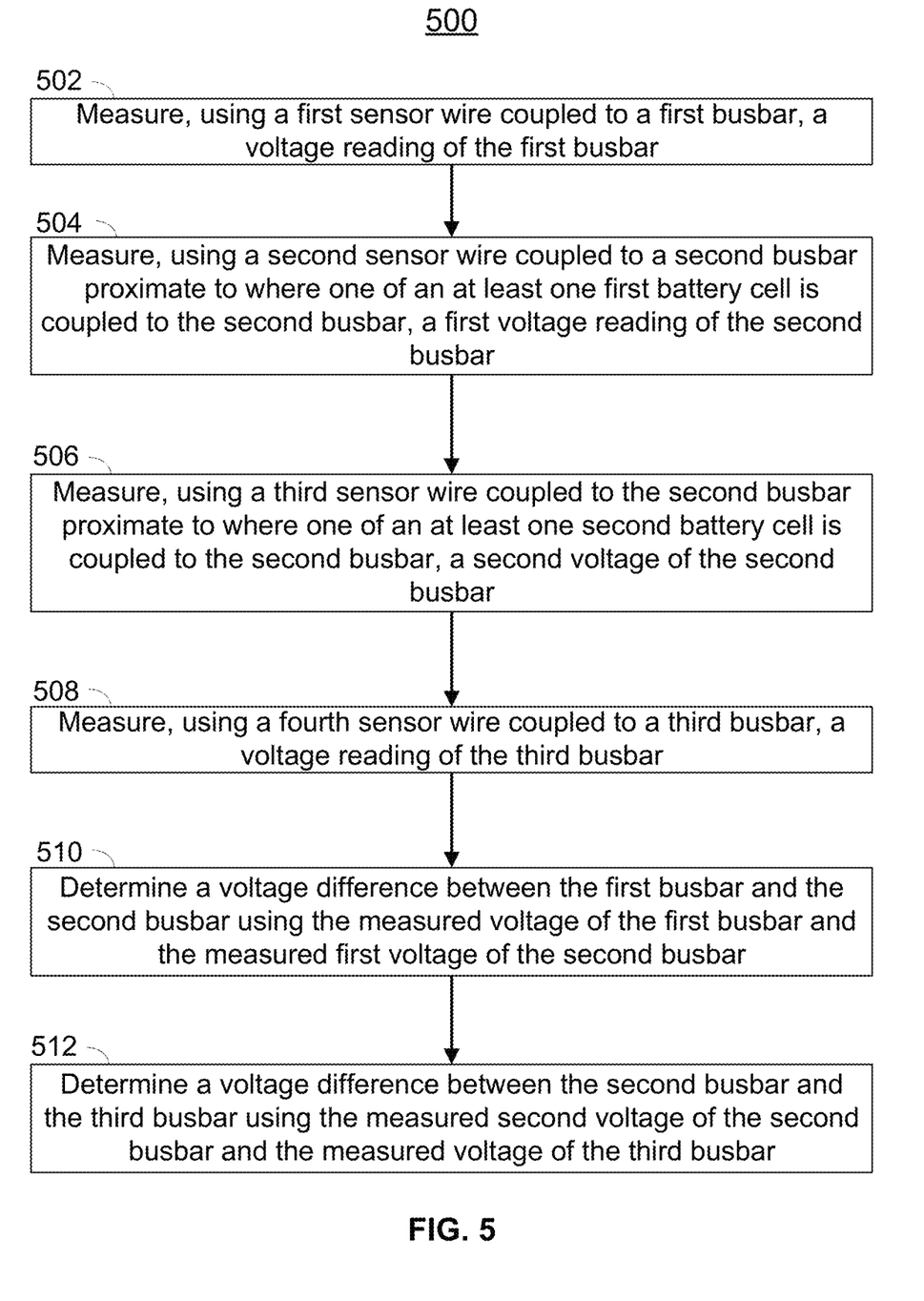
FIG. 5 depicts a flowchart of an illustrative process for operating a battery module, in accordance with at least some embodiments of the disclosure.

FIG. 5 depicts a flowchart of illustrative process 500 for operating a battery module, in accordance with at least some embodiments of the disclosure. The steps of process 500 may be performed by control circuitry coupled to a battery module such as battery module 300 depicted in FIG. 3. Control circuitry may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), and may include a multi-core processor. In some embodiments, processing circuitry may be distributed across multiple separate processors or processing units, for example, multiple of the same type of processing units or multiple different processors. In some embodiments, the control circuitry executes instructions for an application stored in memory. For example, a battery module monitoring board application may provide instructions to the control circuitry to determine voltage measurements across a battery cell.

At step 502, the control circuitry measures, using a first sensor wire coupled to a first busbar, a voltage reading of the first busbar. For example, the first sensor wire can be the sensor wire associated with cell tap 253 of FIG. 3. In this example, the first busbar is the busbar that connects the positive terminal of battery cell 205 and the negative terminal of battery cell 206. Thus, the voltage reading can be the voltage of the busbar spanning battery cells 205 and 206.

At step 504, the control circuitry measures, using a second sensor wire coupled to a second busbar proximate to where one of an at least one first battery cell is coupled to the second busbar, a first voltage reading of the second busbar. For example, the second sensor wire can be the sensor wire associated with cell tap 252. In this example, the second busbar is the busbar that connects the positive terminal of battery cell 206 and the negative terminal of battery cell 207. Thus, the voltage reading can be the voltage of the busbar spanning battery cells 206 and 207 (i.e., spanning the top and bottom sides of battery module 300). The sensor wire associated with cell tap 252 is used to measure a voltage reading of this busbar spanning both the top and bottom of battery module 300 (e.g., a voltage reading at the top of battery module 300).

At step 506, the control circuitry measures, using a third sensor wire coupled to the second busbar, proximate to where one of an at least second battery cell is coupled to the second busbar, a second voltage of the second busbar. For example, the third sensor wire can be the sensor wire associated with cell tap 351. Thus, the voltage reading can be the voltage reading of the busbar spanning battery cells 206 and 207. This voltage reading is not necessarily the same as the voltage reading obtained in step 504 since, as shown in FIG. 3, the noise signals associated with the voltage readings at cell taps 252 and 351 are not in-phase. The sensor wire associated with cell tap 351 is used to measure a voltage reading of the busbar spanning both the top and bottom of battery module 300.

At step 508, the control circuitry measures, using a fourth sensor wire coupled to a third busbar, a voltage reading of the third busbar. For example, the fourth sensor wire can be a sensor wire associated with cell tap 251. In this example, the third busbar is the busbar that connects the positive terminal of battery cell 207 and the negative terminal of battery cell 208. Thus, the voltage reading can be the voltage of the busbar spanning battery cells 207 and 208.

At step 510, the control circuitry determines a voltage difference between the first busbar and the second busbar using the measured voltage of the first busbar and the measured first voltage of the second busbar. For example, a voltage difference between the measured voltage of the first busbar of step 502 and the measured voltage of the second busbar of step 504 is determined. This voltage difference is, in some embodiments, the voltage across battery cell 206 with reduced EMI interference because the associated noise signals 262 and 263 are in-phase.

At step 512, the control circuitry determines a voltage difference between the second busbar and the third busbar using the measured second voltage of the second busbar and the measured voltage of the third busbar. For example, a voltage difference between the measured voltage of the second busbar of step 506 and the measured voltage of the third busbar of step 508 is determined. This voltage difference is, in some embodiments, the voltage across battery cell 307 with reduced EMI interference because the associated noise signals 261 and 361 are in-phase. The control circuitry uses, in some embodiments, the voltage difference to monitor the operation of the battery module. In this way, the control circuitry identifies battery faults or unsafe conditions.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. For example, step 508 may be done after step 510 to measure the voltage difference between busbars in a different order. In some embodiments, steps 502-506 may be done in any order (e.g., step 504, then step 506, and then step 502) to measure voltage readings using the sensor wires in a different order. In addition, the systems and methods described herein may be performed in real-time. It should also be noted, the systems and/or methods described above may be applied to, or used in accordance with, other systems and/or methods.

What is claimed is:

1. A system comprising:
a first plurality of busbars spaced along a top side of a battery module, wherein at least one first battery cell is electrically coupled between an adjacent pair of the first plurality of busbars;
a second plurality of busbars spaced along a bottom side of the battery module, wherein:
at least one second battery cell is electrically coupled between an adjacent pair of the second plurality of busbars; and
one busbar of the first and second pluralities of busbars: spans the top and bottom sides of the battery module; and
is electrically coupled to at least one battery cell located on the top side and at least one battery cell located on the bottom side of the battery module;
a first group of sensor wires extending along the top side, wherein each respective sensor wire of the first group of sensor wires is coupled, at the top side, to at least one of the first plurality of busbars; and
a second group of sensor wires extending along the bottom side, wherein each respective sensor wire of the second group of sensor wires is coupled, at the bottom side, to at least one of the second plurality of busbars, wherein the one busbar is directly coupled, at the top side of the battery module, to one sensor wire of the first group and is directly coupled, at the bottom side of the battery module, to one sensor wire of the second group.

2. The system of claim 1, further comprising a first wiring harness bundling the first group of sensor wires and a second wiring harness bundling the second group of sensor wires.

3. The system of claim 1, further comprising:
first processing circuitry coupled to the first group of sensor wires, wherein the first processing circuitry is configured to receive respective voltage signals from the first group of sensor wires; and
second processing circuitry coupled to the second group of sensor wires, wherein the second processing circuitry is configured to receive respective voltage signals from the second group of sensor wires.

4. The system of claim 1, further comprising a first processing circuitry configured to:
receive a first voltage reading from a first busbar, wherein the first busbar is associated with the top side of the battery module;
receive a second voltage reading from a second busbar, wherein the second busbar is associated with the top side of the battery module and is adjacent to the first busbar; and
compute a first voltage difference between the first voltage reading and the second voltage reading.

5. The system of claim 4, further comprising a second processing circuitry configured to:
receive a third voltage reading from a third busbar, wherein the third busbar is associated with the bottom side of the battery module;
receive a fourth voltage reading from a fourth busbar, wherein the fourth busbar is associated with the bottom side of the battery module and is adjacent to the third busbar; and
compute a second voltage difference between the third voltage reading and the fourth voltage reading.

6. The system of claim 5, wherein the second busbar and the fourth busbar together comprise the one busbar that spans the top and bottom sides of the battery module.

7. The system of claim 5, wherein the first voltage difference comprises a difference between a first noise signal comprising a first phase and a second noise signal comprising a second phase.

8. The system of claim 7, wherein the first phase is substantially in-phase with the second phase.

9. The system of claim 5, wherein the first processing circuitry is powered by the top side of the battery module and the second processing circuitry is powered by the bottom side of the battery module.

10. The system of claim 5, wherein the first processing circuitry is configured to determine the voltage across each adjacent pair of busbars on the top side of the module.

11. The system of claim 5, wherein the second processing circuitry is configured to determine the voltage across each adjacent pair of busbars on the bottom side of the battery module.

12. The system of claim 5, wherein the first voltage difference and the second voltage difference are provided to a battery management system.

13. The system of claim 1, wherein the first plurality of busbars comprises at least five busbars and wherein the second plurality of busbars comprises at least five busbars.

14. The system of claim 1, wherein the battery module is electrically coupled to a load.

15. The system of claim 1, wherein a current flows through the first plurality of busbars in a first spatial direction away from a first side wall and through the second plurality of busbars in a second spatial direction towards the first side wall.

16. The system of claim 15, wherein the first group of sensor wires extends along the top side from the first side wall toward an opposing side wall and the second group of sensor wires extend along the bottom side from the first side wall toward the opposing side wall.

17. The system of claim 15, wherein a first electromagnetic field is induced by the current flowing through the first plurality of busbars in the first spatial direction and a second electromagnetic field is induced by the current flowing through the second plurality of busbars in the second spatial direction.

18. A battery system comprising:
a first group of sensor wires extending along a top side of the battery system, wherein one sensor wire of the first group of sensor wires is directly coupled, at the top side, to a busbar that spans the top side and a bottom side of the battery system; and
a second group of sensor wires extending along the bottom side, wherein one sensor wire of the second group of sensor wires is directly coupled, at the bottom side, to the busbar, wherein:
the first group of sensor wires is configured to provide a voltage reading corresponding to a first battery cell; and
the second group of sensor wires is configured to provide a voltage reading corresponding to a second battery cell.

* * * * *